Nov. 5, 1957  G. P. DE WESTFELT  2,812,484
SYSTEMS FOR LIMITING THE OPERATION OF ELECTRIC SERVOMOTORS
Filed Aug. 2, 1954  2 Sheets-Sheet 1
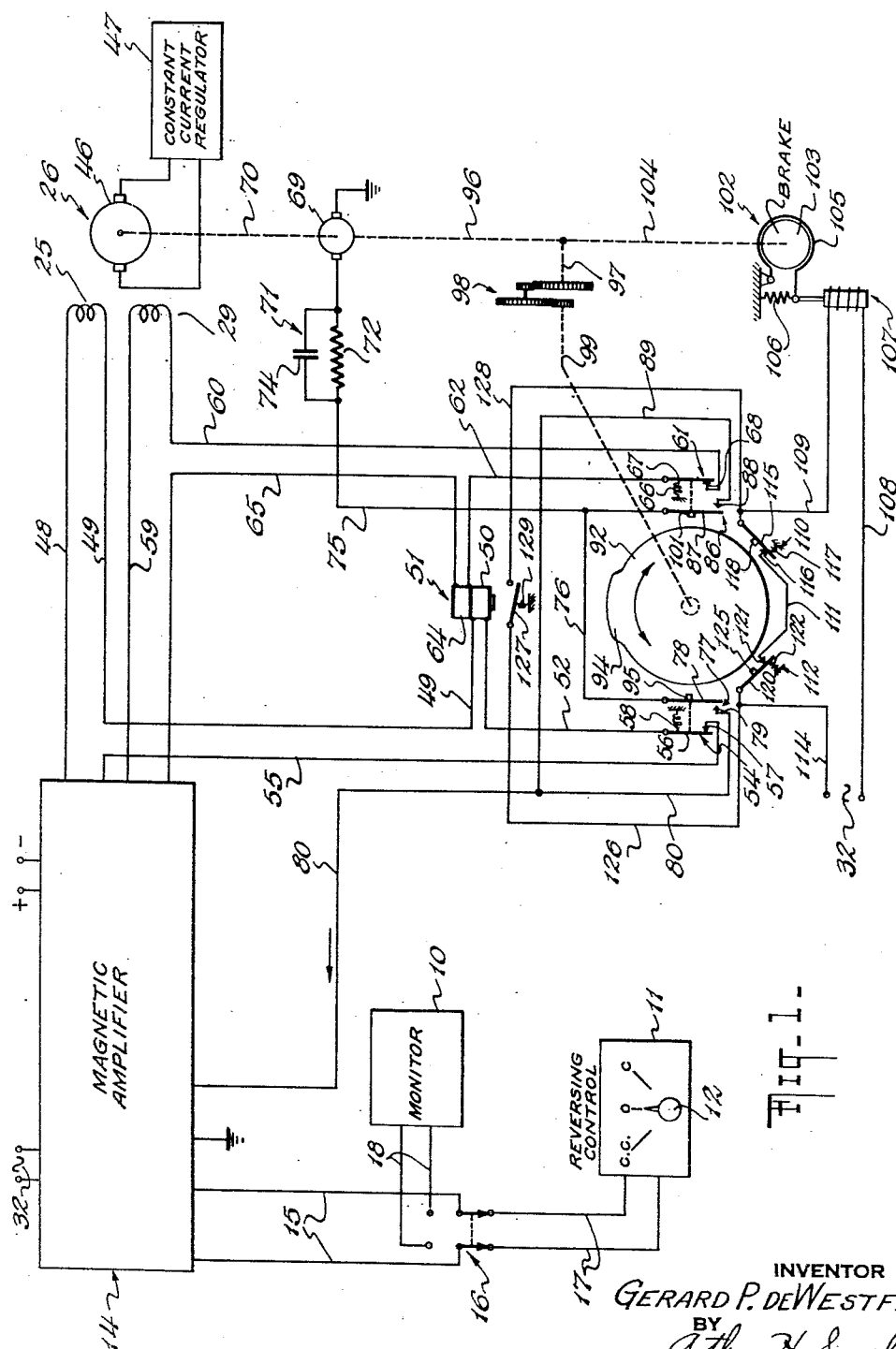
INVENTOR
GERARD P. deWESTFELT
BY
Arthur H. Serrell
ATTORNEY

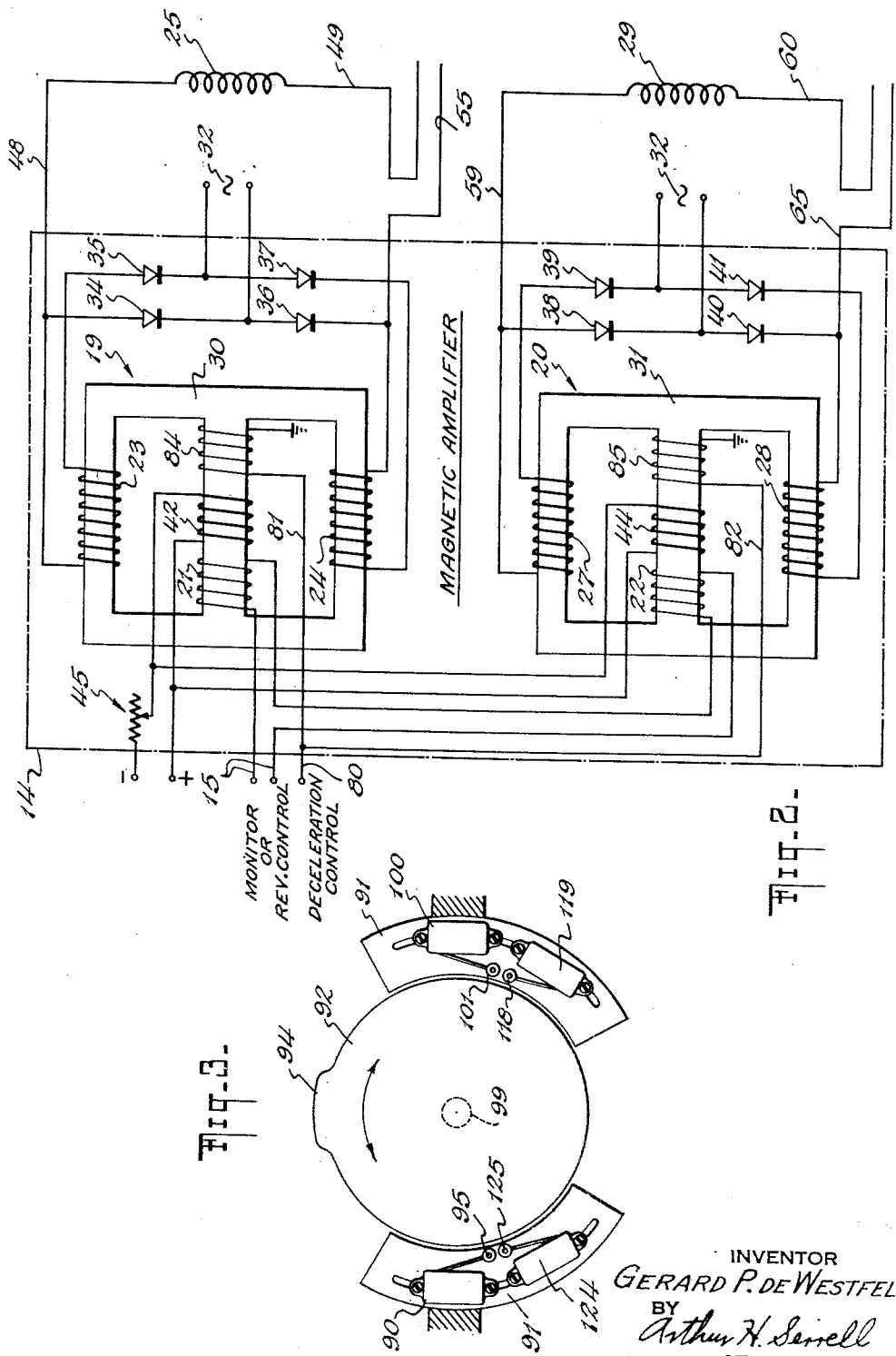

United States Patent Office 2,812,484
Patented Nov. 5, 1957

2,812,484

SYSTEMS FOR LIMITING THE OPERATION OF ELECTRIC SERVOMOTORS

Gerard P. de Westfelt, New York, N. Y., assignor to Sperry Rand Corporation, a corporation of Delaware Application August 2, 1954, Serial No. 446,998

9 Claims. (Cl. 318—266)

This invention relates to a rotation arresting system for a reversible, field controlled, direct current, type of servomotor effective to maintain its operations within predetermined limits. With the approach to the limit defining condition during operation of the servomotor within its premitted range in either a clockwise or counter-clockwise direction, the improved system functions sequentially to initially retard the servomotor dynamically and secondly to render a brake effective to stop the servomotor. The operating range permitted the servomotor is determined by the setting of adjustable limit stop devices such as employed on a gun, searchlight or other rotatable object of confine the movements thereof about an axis to the extent desired, the gun, searchlight or other object being driven within the permitted operating range of the servomotor of the system. The system includes a means for differentially exciting the field windings of the servomotor in accordance with the magnitude and sense of a reversible control signal adapted to determine its direction of rotation within its permitted range of operation.

One of the objects of the invention is to provide a motion limiting system of the character described in which the operating field winding circuit of the servomotor is opened with approach to the determined limit condition and the opposing field winding of the servomotor is energized by a signal proportional to the rate of change of speed or deceleration of the servomotor to provide dynamic braking thereof.

A further object of the invention is the inclusion in a system of the character described of a brake connected to the armature of the servomotor in a normally disengaged condition that is rendered effective to stop the servomotor with approach thereof to the respective limiting conditions of the servomotor.

Another object of the invention is to provide a system of the character described that includes means permitting reversal of the servomotor that provides a secondary instrumentality for disengaging the brake of the system.

A still further object of the invention is to provide a limiting system of the character described in which the output of a magnetic amplifier is utilized to differentially excite the control field windings of the servomotor and the dynamic braking signal of the system is supplied as an input to the amplifier.

Other objects and specific advantages of the invention will become apparent from the following description taken in connection with the accompanying drawings, wherein, Fig. 1 is a schematic view and wiring diagram of a limit defining system embodying the present inventive concepts, Fig. 2 is an enlarged detail view of the magnetic amplifier unit depicted in Fig. 1, and Fig. 3 is a detail view of the switches and cam followers constituting the adjustable limit stop devices of the present invention.

As shown in Fig. 1, the servomotor operating system of the present invention includes a suitable source of electrical control signal depicted herein generally as an element designated monitor 10 or reversing control 11. Where the load on the system is a gun or searchlight, monitor 10 may be any control device providing a signal for operating the servomotor within its designated limits that maintains the gun or searchlight directed on a target. The reversing control 11 is a signal device with a knob 12 settable manually by the operator of the system in either counterclockwise, null or clockwise positions as indicated. It will be understood, that the control device 11 provides an output of proper sense or polarity to drive the servomotor of the system in a counterclockwise direction when the knob 12 is set in the corresponding position. With setting of the knob 12 in the clockwise position, the reversed sense or polarity output of the device 11 is such as to cause the servomotor of the system to rotate in a clockwise direction. As shown, the system may be controlled either automatically by the signal of the monitor 10 or manually by the signal of the reversing control 11. Alternatively, the signals provide an input to a suitable magnetic amplifier 14 by way of leads 15 and a suitable double pole, six terminal switch 16 which in the closed position shown in Fig. 1 connects the amplifier 14 to the reversing control 11 through the leads 17 to the closed terminals of the switch. Leads 18 connect the monitor 10 to the open terminals of the switch 16.

As shown in Fig. 2, the magnetic amplifier 14 of the system may be provided by two self-excited, saturable reactors as indicated at 19 and 20 that are of identical construction. The respective reactors produce an amplified output signal proportional to the controlling input signal thereto that is utilized differentially to excite the respective field windings of the servomotor of the system. In this connection, the series connected input coils 21, 22 for the respective reactors 19, 20 of the amplifier 14 are energized by the output of either the monitor 10 or reversing control 11 by way of lead 15. As shown, reactor 19 includes output coils 23, 24 whose signal energizes the field winding 25 controlling counterclockwise rotation of a reversible direct current servomotor indicated at 26. The output coils 27, 28 of the reactor 20 control the clockwise rotation of the servomotor by energizing the clockwise rotation producing field winding 29 thereof.

The respective reactors 19 and 20 of the representative magnetic amplifier 14 shown in Fig. 2 include individual iron core structures designated at 30 and 31. As shown, the input coils 21 and 22 are wound round the central legs of the respective core structures 30 and 31. The output, load, or self excitation coils 23, 24 of reactor 19 are wound around the outer legs of the core structure 30. Coils 23, 24 are energized from a suitable source of alternating current 32 through rectifiers 34, 35, 36 and 37 to provide the direct current required to self-excite the reactor 19. In a similar fashion, coils 27 and 28 of reactor 20 are wound around the outer legs of the core structure 31. The load or self-excitation coils 27 and 28 of reactor 20 are also energized from a suitable alternating current source 32 by way of the rectifiers indicated at 38, 39, 40 and 41. The biasing coils 42, 44 for the respective reactors 19, 20 are wound around the central legs of the respective cores 30 and 31. These coils control the amplification factor of the amplifier 14, the same being connected in parallel and energized from a suitable source of direct current by way of potentiometer 45 as shown in Fig. 2. The respective field windings 25, 29 of the servomotor are accordingly differentially excited by the amplified output of the magnetic amplifier 14 depending upon the magnitude and sense or polarity of the controlling input signal from either the monitor 10 or reversing control 11.

The servomotor 26 of the system includes the counterclockwise rotation controlling field winding 25, the clockwise rotation controlling field winding 29 and an armature 46 whose input is controlled at a substantially constant energy level by means of a suitable constant current regulator designated at 47.

In accordance with the present inventive concepts, the means for differentially exciting the field windings of the servomotor 26 includes an input circuit from amplifier 14 to each of the control field windings 25 and 29. The first of these input circuits includes lead 48 from output coil 23, winding 25, lead 49 to the coil 50 of a two coil relay 51, lead 52 to a normally closed switch 54, and lead 55 to the output coil 24 of reactor 19. Blade 56 of switch 54 is normally held in engagement with contact 57 thereof by a suitable spring such as indicated at 58. The input circuit for the clockwise rotation controlling winding 29 includes lead 59 from output coil 27 of reactor 20, winding 29, lead 60, the normally closed switch 61, lead 62 to the second coil 64 of relay 51, and lead 65 to the output coil 28 of the reactor 20. The spring 66 normally biases the blade 67 of switch 61 against its contact 68. Within the range of operation permitted by the system, the switches 54 and 61 are respectively maintained in a closed condition by the spring elements 58 and 66.

The improved system further includes normally ineffective means for dynamically braking the servomotor with approach to either the clockwise rotation limit thereof or the counterclockwise rotation limit thereof. As shown in Fig. 1, the servomotor is dynamically braked by a signal dependent on the rate of change of the speed or deceleration of the servomotor when the input circuit to the operating field winding is broken with approach to the rotational limits defined by the system. This signal is obtained in the present instance by means of a direct current tachometer or permanent magnet speed generator indicated at 69 that is coupled to the driving servomotor by shafting 70. One end of the generator 69 is shown grounded, the other end feeding a differentiator in the form of a rate network consisting of resistor 72 and condenser 74. The dynamic braking means further includes a normally open braking circuit between the amplifier 14 and the described braking signal means provided by lead 75 connected to the output end of the network 71, and lead 76 to a normally open third switch 77 with separated blade and contact parts respectively indicated at 78 and 79. A lead 80 connects the contact 79 of switch 77 to the respective leads 81 and 82 to the input ends of the deceleration control coils 84, 85 on the central core legs of the respective reactors 19, 20. As shown, the opposite ends of the coils 84 and 85 are suitably grounded. The braking circuit also contains a fourth normally open switch 86, whose blade 87 is connected to lead 75. The contact 88 of switch 86 is connected to the lead 80 by way of lead 89. As represented in Fig. 1, the switches 54 and 77 are ganged by a suitable mechanical connection between the blades 56 and 78 thereof so that the common spring 58 also serves to maintain the switch 77 in its normal open condition. Switches 61 and 86 are shown in Fig. 1 as similarly ganged by a suitable mechanical interconnection between the respective blade elements 67 and 87 thereof. In this instance, the spring 66 also functions to maintain the switch 86 in its normal open condition. It will be understood that within the range of operation of the servomotor determined by the system, the described dynamic braking means is ineffective due to the open switches 77 and 86 in the braking circuit.

As represented in Fig. 3, the ganged switches 54, 77 are shown as a single switch unit with a housing 90 that is adjustably settable on a fixed mounting piece for a body such as a gun or searchlight through a suitable screw and slot connection. The setting effected is in relation to the axis of a cam element 92 whose rise portion 94 cooperates with follower 95 providing the actuator element for the switches 54, 77. As shown, the cam element 92 is driven by the servomotor 26 by way of shafting 70, shafting 96, shafting 97, reduction gearing 98 and shafting 99. With energization of winding 25, the servomotor 26 rotates in a counterclockwise direction driving the cam element 92 in a like direction until the rise portion 94 thereof engages the follower 95. This operation results in the opening of the switch 54 to break the input circuit to the driving field winding 25. It also results in the closure of the described normally open braking circuit through switch 77, the differentiated output signal of the generator 69 being connected to coil 85 of the amplifier 14 by way of lead 75, lead 76, closed switch 77 and leads 80 and 82. The amplified signal measure of the deceleration of the servomotor is consequently effective through the opposing field winding 29 and its closed input circuit to dynamically brake the servomotor. The cam element 92 driven by the servomotor and follower 95 provide a means conditioned by the servomotor with approach to the determined limit position in a counterclockwise direction for opening the input circuit to winding 25 through switch 54 and closing the braking circuit to the opposing field winding 29 through switch 77. A similar arrangement is provided for determining the clockwise rotation limits defined by the system through coaction with switches 61 and 86. The blades 67 and 87 of these switches are ganged by a mechanical interconnection as represented in Fig. 1 and the common housing 100 thereof is secured to the fixed mounting piece 91 through a second screw and slot connection as shown in Fig. 3. The setting of housing 100 is in relation to the axis of the cam element 92 whose rise portion 94 cooperates with a follower 101 in determining the clockwise rotation limits defined by the system. The means conditioned by the servomotor for limiting its operation with approach to the limit with a clockwise direction of rotation is provided by the cooperating cam element 92 and follower 101 which functions to open switch 61 and close switch 86. In the operation of the system at this limit position, the input circuit to field winding 29 is opened and the dynamic braking signal supplied to coil 84 of the amplifier 14 energizes the opposing field winding 25 of the servomotor. By adjusting the positions of the respective housings 90, 100, the range of operation of the servomotor of the system may be lengthened or shortened in accordance with required conditions of operation.

The improved system includes a mechanical braking device for engaging the servomotor in either of its determined limiting positions to prevent operation beyond the permitted range. In view of this inclusion, the followers 95 and 101 are situated a few degrees ahead of the actual stopping positions of the servomotor and the dynamic braking circuit is designed such as to supply a counteracting torque to the servomotor opposing its rotation that will bring it to a standstill condition as the mechanical braking device is rendered effective. As shown in Fig. 1, the system contains a brake indicated at 102 with a drum element 103 driven by the servomotor by way of the shafting 70, 96 and additional shafting 104. A curved shoe member 105 cooperating with the drum 103 is anchored at one of its ends to a suitable fixed element. A spring 106 between the fixed element and the free end of the shoe member 105 is effective to engage the parts of the friction bark so that the servomotor is stopped at the respective limiting positions. The described brake is engageably connected to the armature of the servomotor through the described shafting. The system includes means for normally maintaining the brake in a disengaged condition relative to the armature of the servomotor. As shown, this normally effective means is provided by a solenoid 107 whose armature is connected to the free end of the brake shoe 105 in a position to stretch the spring 106 to disengage the brake shoe and drum parts. The coil of solenoid 107 is normally energized by a suitable source 32 of electrical energy 32 in a closed circuit including lead 108, the coil of solenoid 107, lead 109, normally closed switch 110, lead 111, normally closed switch 112 and lead 114. Switch 110 is the limit determining switch for the clockwise rotation of the servomotor, the blade 115 thereof normally engaging contact 116 through the influence of spring 117. A cam follower 118 extends from the blade 115 of the switch 110 in a position to cooperate with the rise portion 94 of the cam element 92. The housing 119 for the switch 110 is adjustably positioned on the fixed mounting element 91 so that the follower 118 is set a few degrees behind the follower 101.

The counterclockwise rotation limiting switch 112 provided includes a blade 120 normally engaged with contact 121 by spring 122. The housing 124 and cam follower 125 parts of the switch 112 are located on the fixed mounting 91 in a position so that the follower 125 is a few degrees behind the follower 95. Follower 125 also cooperates with the rise portion 94 of the cam element 92. Due to the arrangement of the respective switches on the fixed mounting 91, the cam 92 is effective sequentially in either direction of rotation of the servomotor as it approaches the limit position to initially engage either follower 95 or 101 to open one of the field winding input circuits as well as close the normally open circuit for dynamically braking the servomotor through the opposed field winding and to secondly engage either follower 125 or 118. By this subsequent operation in point of time, the circuit included in the brake disengaging means is opened to render the solenoid 107 ineffective so that the brake spring 106 functions to engage the brake and thusly stop the rotation of the servomotor within the range determined by the system. Limit switches 110 and 112 are arranged in series in the normally effective brake disabling circuit. In the limiting position of the switches 110 or 112, one of the blades thereof is separated from its respective contact part by the actuation of the rise of the cam element 92 and the corresponding follower. The cam element 92 and followers 118, 125 constitute a means conditioned by the servomotor with approach to the determined limit position in either direction to render the described normally effective brake disengaging means ineffective. In either limiting position, one of the field winding input controlling switches 54 or 61 and one of the brake engaging switches 110 or 112 is in an open condition.

As shown in Fig. 1, the system also includes a means for restoring the servomotor to normal operation in the form of a normally open circuit shunting the switches 110 and 112. This circuit contains lead 114 from source 32, lead 126, the armature 127 of relay 51, and lead 128 connected to lead 109. Spring 129 normally biases the armature 127 of the relay 51 to an open condition. The restoring means further includes the reversing control 11 and the relay 51 common to both of the input circuits of the field windings which operates when the brake is engaged in response to a reversing control signal from amplifier 14 to close the shunt circuit for switches 110, 112 and energize solenoid 107 from the source 32. This releases the brake 102 and permits the servomotor to rotate away from the limit defining positions. The described restoring means constitutes a normally ineffective means for maintaining the brake in a disengaged condition. As soon as the servomotor has rotated sufficiently to move the rise portion 94 of the cam element 92 away from the followers 118 or 125 the normally effective brake disengaging circuit is returned to normal operation. The relay 51 in the input circuit to the field windings is not operative to close the shunt circuit in normal operation of the servomotor with its armature free to rotate. With the increased current obtained in the input circuit when the armature of the servomotor is locked in position by the brake 102, the relay 51 responds in the manner described to release the brake and restore the servomotor to a normal unrestrained condition.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A system for limiting the operation of a reversible D. C. servomotor having a field winding for controlling clockwise rotation of the servomotor, a field winding for controlling counterclockwise rotation of the servomotor, a constantly energized armature, means for differentially exciting the field windings according to the magnitude and sense of a reversible control signal including a first input circuit to the clockwise rotation controlling field winding having a normally closed first switch therein and a second input circuit to the counterclockwise rotation controlling field winding having a normally closed second switch therein, means for providing a signal in accordance with the rate of change of the speed of the servomotor; a normally open braking circuit for said servomotor including said speed change signal means, a normally open third switch ganged to the first switch and a normally open fourth switch ganged to the second switch; means initially conditioned by said servomotor for opening the first switch and closing the third switch with approach to the determined limit position of the servomotor in a clockwise direction, means initially conditioned by said servomotor for opening the second switch and closing the fourth switch with approach to the determined limit position of the servomotor in a counterclockwise direction, a brake engageably connected to the armature of the servomotor, normally effective means for maintaining the brake disengaged from the armature including a circuit with fifth and sixth normally closed switches therein, means conditioned by said servomotor subsequently to the conditioning of said initial conditioning means with approach to the determined limit positions in either direction to render said maintaining means ineffective by opening either the fifth or sixth switches, means for reversing said servomotor with one of the field circuit switches in an open condition including a normally open circuit shunting the fifth and sixth switches of said maintaining means, and a relay in both of the input circuits of the field windings operable to close said shunt circuit to disengage the brake, the system operating sequentially to initially close the normally open braking circuit through either the third or fourth switches so that the signal of said speed change signal means exerted through the opposing field winding effects dynamic braking of the servomotor and to secondly engage the brake and armature.

2. A system of the character claimed in claim 1, in which the signal providing means includes a direct current tachometer driven by said motor and a rate network in the braking circuit fed from the output of the tachometer.

3. In a system for limiting the operation of a reversible D. C. motor with a field winding for controlling clockwise rotation of the motor, a field winding for controlling counterclockwise rotation of the motor, and a constantly energized armature; the combination of, means for differentially exciting the field windings of the motor according to the magnitude and sense of a reversible control signal including a magnetic amplifier receiving the control signal having a first output circuit to the clockwise rotation controlling field winding with a normally closed first switch therein and a second output circuit to the counterclockwsie rotation controlling field winding with a normally closed second switch therein, means providing a signal in accordance with the rate of change of the speed of the motor; a normally open braking circuit for said motor providing a second input to said magnetic amplifier including said signal means, a normally open third switch ganged to the first switch and a normally open fourth switch ganged to the second switch; means conditioned by said motor for opening the first switch and closing the third switch with approach to the determined limit position of the motor in a clockwise direction, and means conditioned by said motor for opening the second switch and closing the fourth switch with approach to the determined limit position of the motor in a counterclockwise direction, the system operating to close the normally open braking circuit to the amplifier through either the third or fourth switches and open one of the two field winding input circuits through either the first or second switch so that the signal of said rate of change signal means exerted through the opposing field winding effects dynamic braking of the motor.

4. A system of the character claimed in claim 3, in which said rate of change signal providing means includes a speed generator coupled to the motor and means for differentiating the output of the generator.

5. In a system for limiting the operation of a reversible D. C. motor with a field winding for controlling clockwise rotation of the motor, a field winding for controlling counterclockwise rotation of the motor, and a constantly energized armature; the combination of, means for differentially exciting the field windings of the motor according to the magnitude and sense of a reversible control signal including a first input circuit to the clockwise rotation controlling field winding having a first normally closed switch therein and a second input circuit to the counterclockwise rotation controlling field winding having a second normally closed switch therein, means conditioned by said motor for opening the switch in the first input circuit with approach to the determined limit position of the motor in a clockwise direction, means conditioned by said motor for opening the switch in the second input circuit with approach to the determined limit position of the motor in a counterclockwise direction, a brake engageably connected to the armature of the motor, normally effective means for maintaining the brake disengaged from the armature, means conditioned by said motor with approach to the determined limit positions in either direction to render said maintaining means ineffective, means for reversing said motor with either one of the field circuit switches in an open condition including a normally ineffective second means for maintaining the brake disengaged from the armature, and a relay in both of the input circuits to the field windings operable to render said second brake disengaging means effective.

6. In a system for limiting the operation of a reversible D. C. motor having opposed field windings, means for differentially exciting the field windings of the motor according to the magnitude and sense of a reversible control signal including a first input circuit to one of the field windings having a normally closed switch therein and a second input circuit to the other of the field windings having a normally closed second switch therein, means conditioned by said motor with approach to the determined limit position in one direction for opening the first switch, means conditioned by said motor with approach to the determined limit position in the other direction for opening the second switch, a braking device engageably connected to the motor, means for normally maintaining said friction braking device in disengaged condition, means conditioned by said motor with approach to the determined limit position in either direction for rendering said normal brake maintaining means ineffective, and means for reversing the motor with one of the field circuit switches in open condition and with the friction braking device engaged including a relay common to both of the input circuits of the field windings operable to disengage the friction braking device and restore the brake disengaging means to normal condition.

7. The combination in a limit defining system of a reversible D. C. motor having opposed field windings, an input circuit to one of the field windings, an input circuit to the other of the field windings, a friction braking device engageably connected to the motor, means for normally maintaining said braking device in disengaged condition, means conditioned by said motor with approach to the determined limit position for opening one of the input circuits to the field windings and for rendering said normal brake maintaining means ineffective, and means for reversing the motor with one of the field winding input circuits open and with the friction braking device engaged including a relay common to both of the input circuits operable to disengage the friction braking device and restore the brake disengaging means to normal condition.

8. The combination in a limit defining system of a reversible D. C. motor having opposed field windings, a magnetic amplifier providing an output for differentially exciting the field windings of the motor, a normally closed circuit connecting each of the field windings of the motor and said magnetic amplifier, first means conditioned by said motor with approach to a determined limit position in a clockwise direction to open one of the normally closed field circuits, second means conditioned by said motor with approach to a determined limit position in a counterclockwise direction to open the other of the normally closed field circuits, a braking device engageably connected to the motor, means for normally maintaining said braking device in disengaged condition, third means conditioned by said motor with approach to either of the determined limit positions for rendering said normal brake maintaining means ineffective, and means for reversing the motor with one of the field winding circuits opened and with the braking device engaged including signal means providing a reversible input to said magnetic amplifier.

9. The combination in a limit defining system of a reversible D. C. motor having opposed field windings, and input circuit to one of the field windings, an input circuit to the other of the field windings, normally disconnected means for dynamically braking the motor through one of the field windings thereof, a braking device engageably connected to the motor, means for normally maintaining said braking device in disengaged condition, first means conditioned by said motor with approach to a determined limit position in a clockwise direction to open one of the input circuits to the field windings and connect the dynamic braking means to the other of the input circuits to the field windings, second means conditioned by said motor with approach to a determined limit position in a counterclockwise direction to open the other of the input circuits to the field windings and connect the dynamic braking means to the one of the input circuits, and third means conditioned by said motor at a time subsequent to the conditioning of one of said first or second conditioning means with approach to a determined limit position in either direction for rendering said normal brake maintaining means ineffective.

References Cited in the file of this patent
UNITED STATES PATENTS

| | | |
|---|---|---|
| 2,257,031 | Barth | Sept. 23, 1941 |
| 2,434,680 | White et al. | Jan. 20, 1948 |
| 2,440,319 | Wickersham | Apr. 27, 1948 |
| 2,654,061 | Gille | Sept. 29, 1953 |